United States Patent [19]

Kazaoka et al.

[11] Patent Number: 4,711,497
[45] Date of Patent: Dec. 8, 1987

[54] SEAT FOR VEHICLES

[75] Inventors: Kenichi Kazaoka, Nagoya; Fumio Wakamatsu, Okazaki; Yasuo Shinkai, Nagoya, all of Japan

[73] Assignee: Aisin Seiki Kabushika Kaisha, Japan

[21] Appl. No.: 745,421

[22] Filed: Jun. 17, 1985

[30] Foreign Application Priority Data

Jun. 18, 1984 [JP] Japan .................. 59-126220
Jun. 20, 1984 [JP] Japan .................. 59-128303
Jun. 20, 1984 [JP] Japan .................. 59-128304

[51] Int. Cl.$^4$ .............................. A47C 7/02
[52] U.S. Cl. .................. 297/458; 297/452; 297/460; 297/DIG. 2
[58] Field of Search ............... 297/452, DIG. 2, 458, 297/460, DIG. 1, 284, 459

[56] References Cited

U.S. PATENT DOCUMENTS

| 2,649,136 | 8/1953 | Eames ............... 297/452 X |
| 3,819,232 | 6/1974 | Wagner .................. 297/458 |
| 4,047,757 | 9/1977 | Eames et al. ......... 297/460 X |
| 4,065,182 | 12/1977 | Braniff et al. ......... 297/452 |
| 4,165,126 | 8/1979 | Strien et al. ......... 297/452 X |
| 4,368,917 | 1/1983 | Ural .................... 297/452 |
| 4,418,958 | 12/1983 | Watkin ............ 297/DIG. 2 |
| 4,502,731 | 3/1985 | Snider ................. 297/452 |
| 4,529,247 | 7/1985 | Stumpf et al. ..... 297/DIG. 2 |

FOREIGN PATENT DOCUMENTS

| 3001627 | 7/1981 | Fed. Rep. of Germany ...... 297/452 |
| 3122351 | 12/1982 | Fed. Rep. of Germany ...... 297/458 |
| 55-118715 | 11/1980 | Japan . |

Primary Examiner—Kenneth J. Dorner
Assistant Examiner—Mark W. Binder
Attorney, Agent, or Firm—Finnegan, Henderson, Farabow, Garrett & Dunner

[57] ABSTRACT

A seat mounted on a vehicle floor comprising a seat frame and a backrest. The seat frame contains a plastic base member and an open section formed within the base member. The base member is circumscribed by a rim extending upward along a substantial portion of the base member and a support surface extending outward from the base member substantially perpendicular to the rim. The base member contains a plate section integrally connected to the base member and extending within the open section. A device is provided for adjustably supporting the seat frame along the floor of the vehicle. A pair of support rods are connected to the adjustable support device and the seat frame is mounted on the support rods. A device is also provided for flexibly supporting the plate section in response to downward pressure thereon. A seat cushion is mounted on the seat frame. The backrest, which is connected to the seat frame, includes a fixed backrest frame having sidewalls extending outward from the backrest frame. A plastic backplate is flexibly mounted between the sidewalls and a device is provided for connecting the backrest plate to the backrest frame. The backplate and the connecting device are integrally formed. The backrest cushion is mounted on the backrest frame.

10 Claims, 15 Drawing Figures

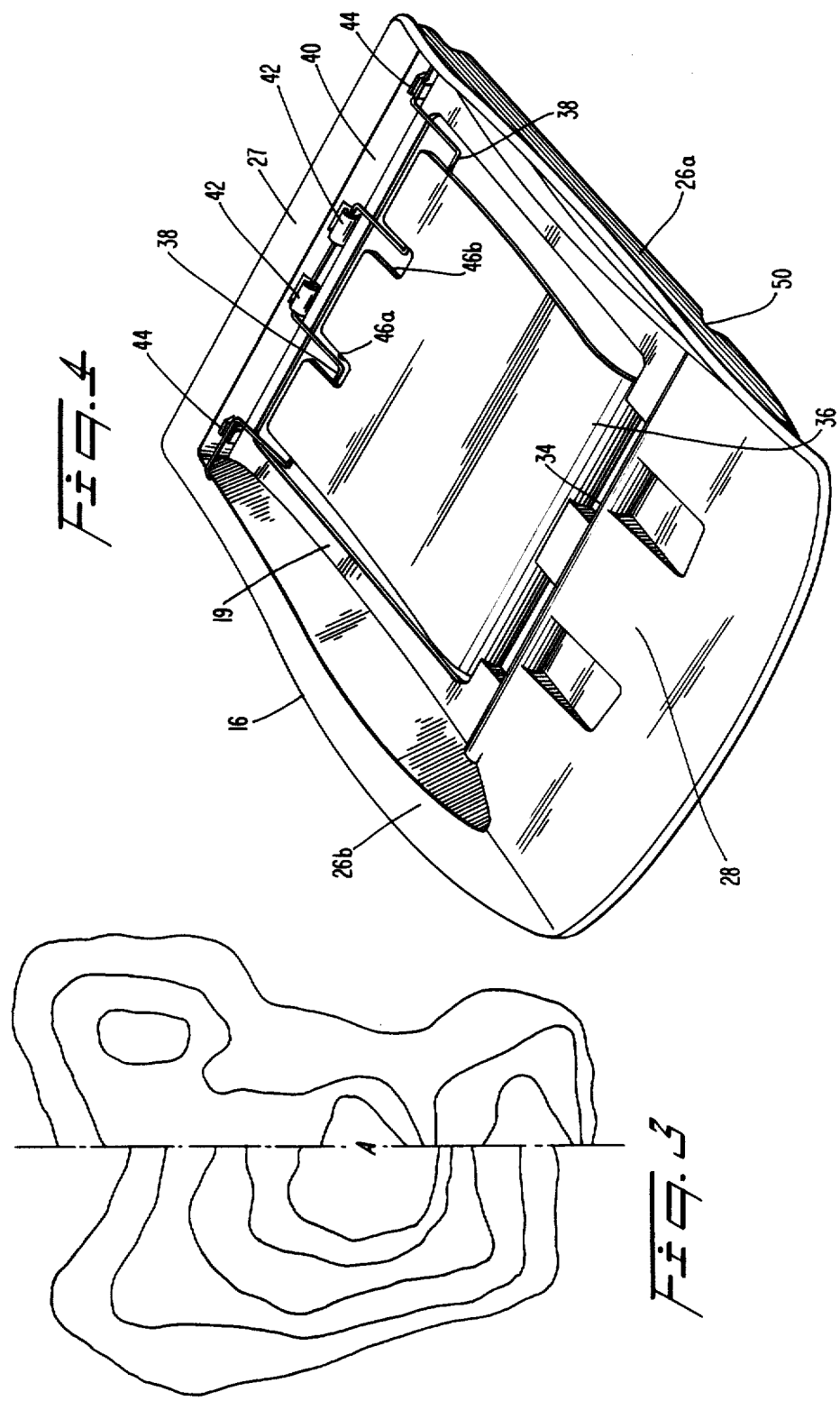

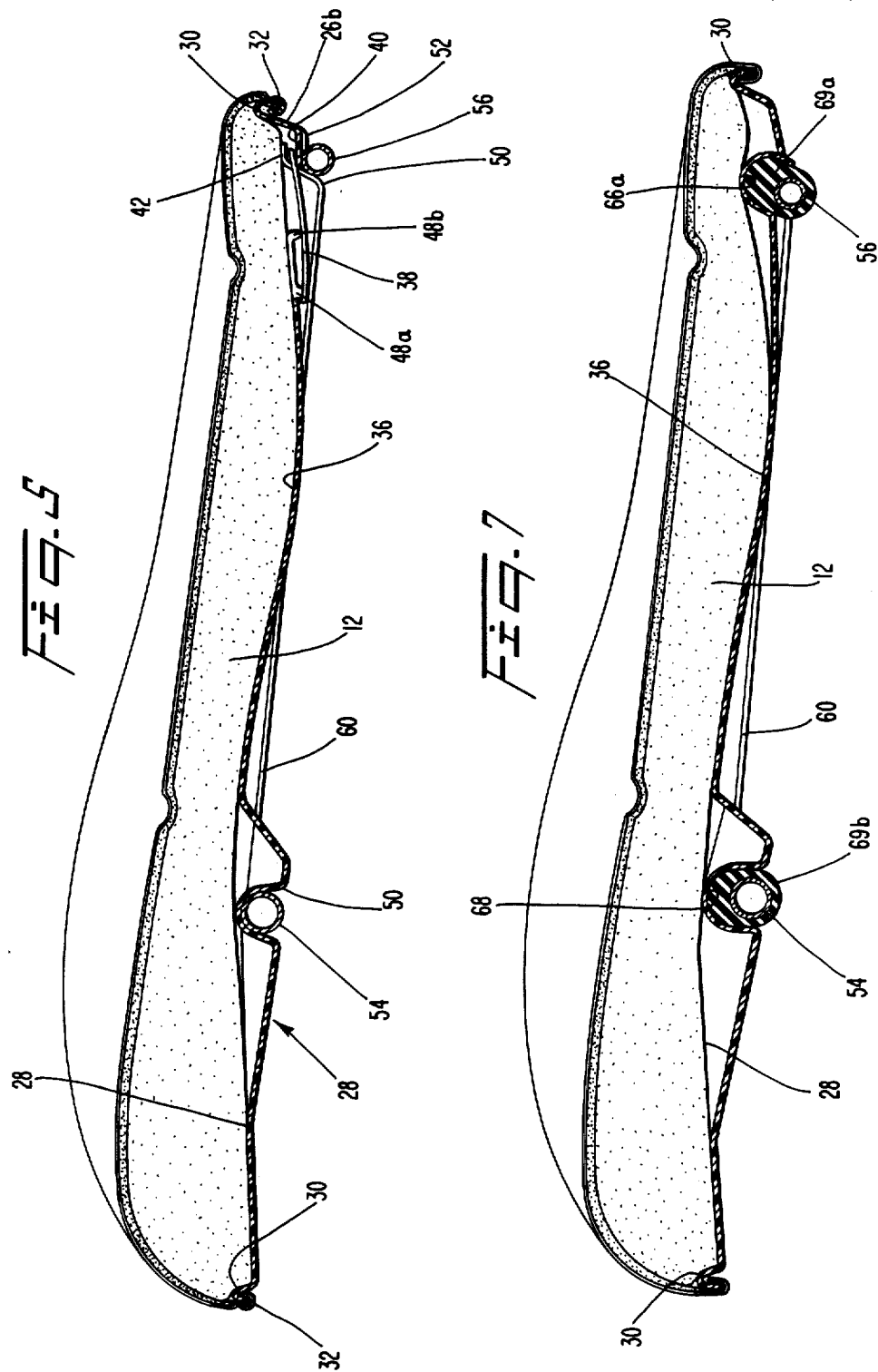

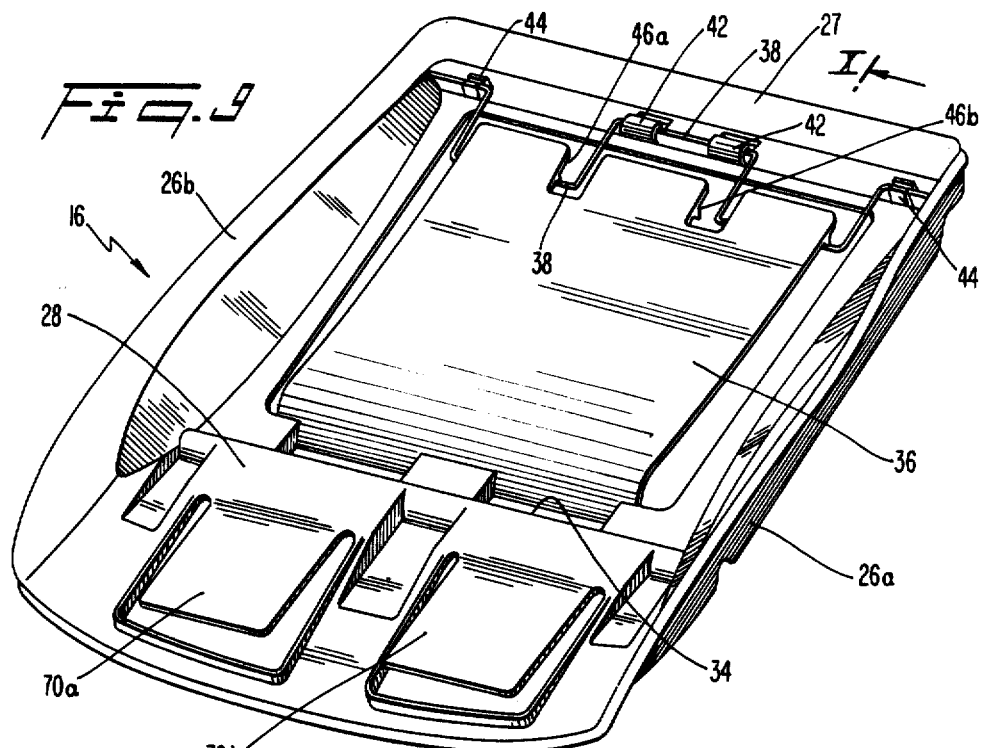
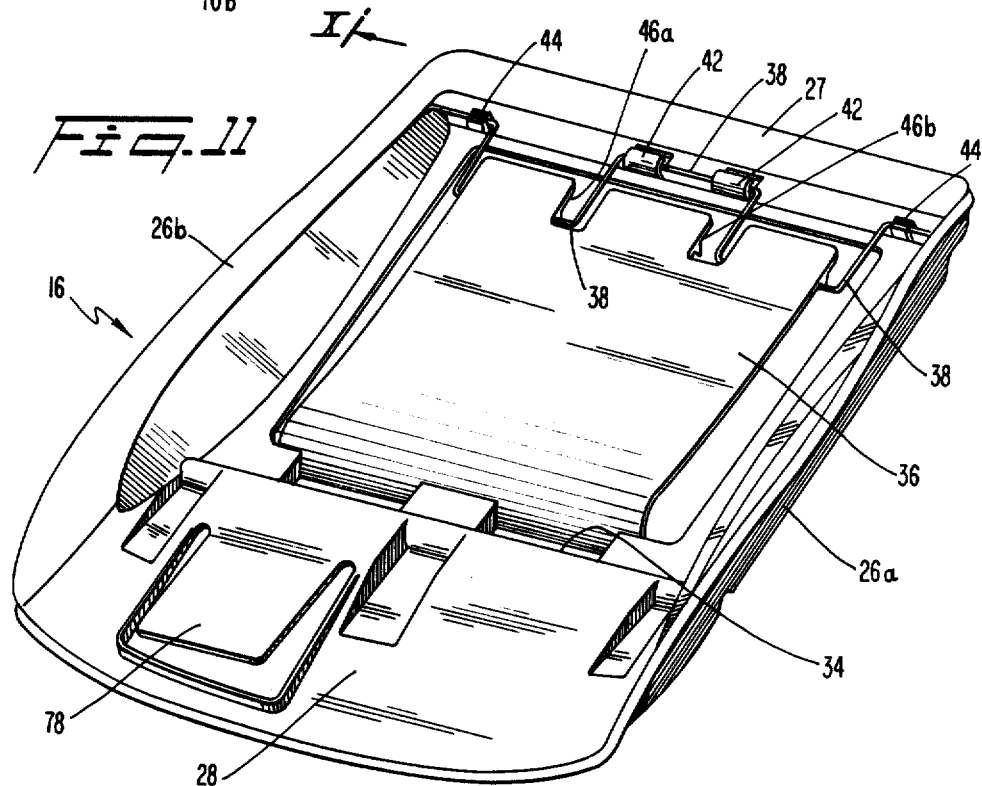

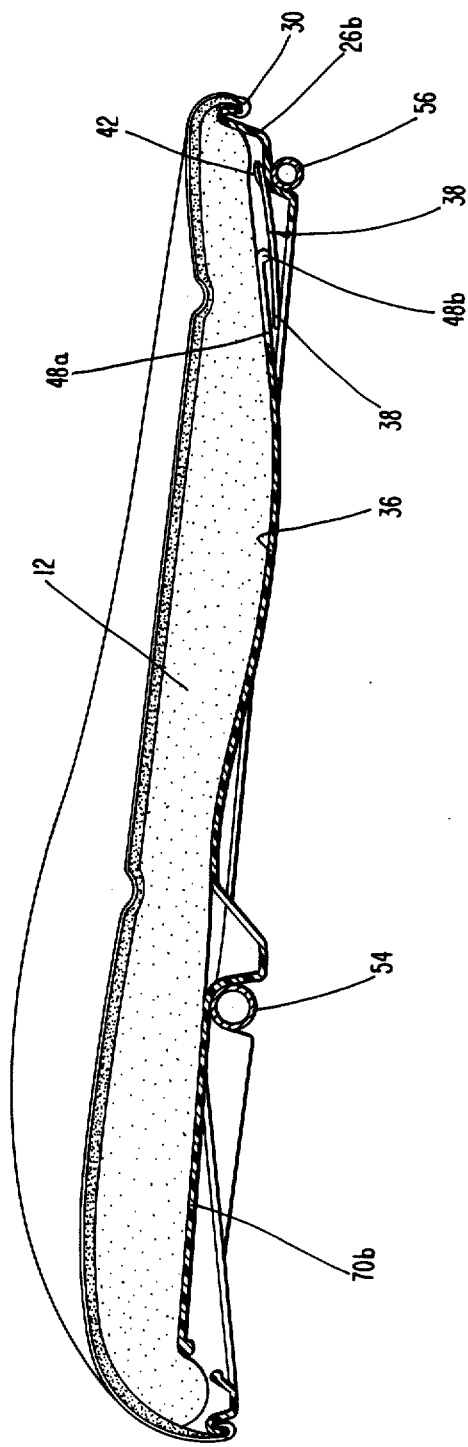

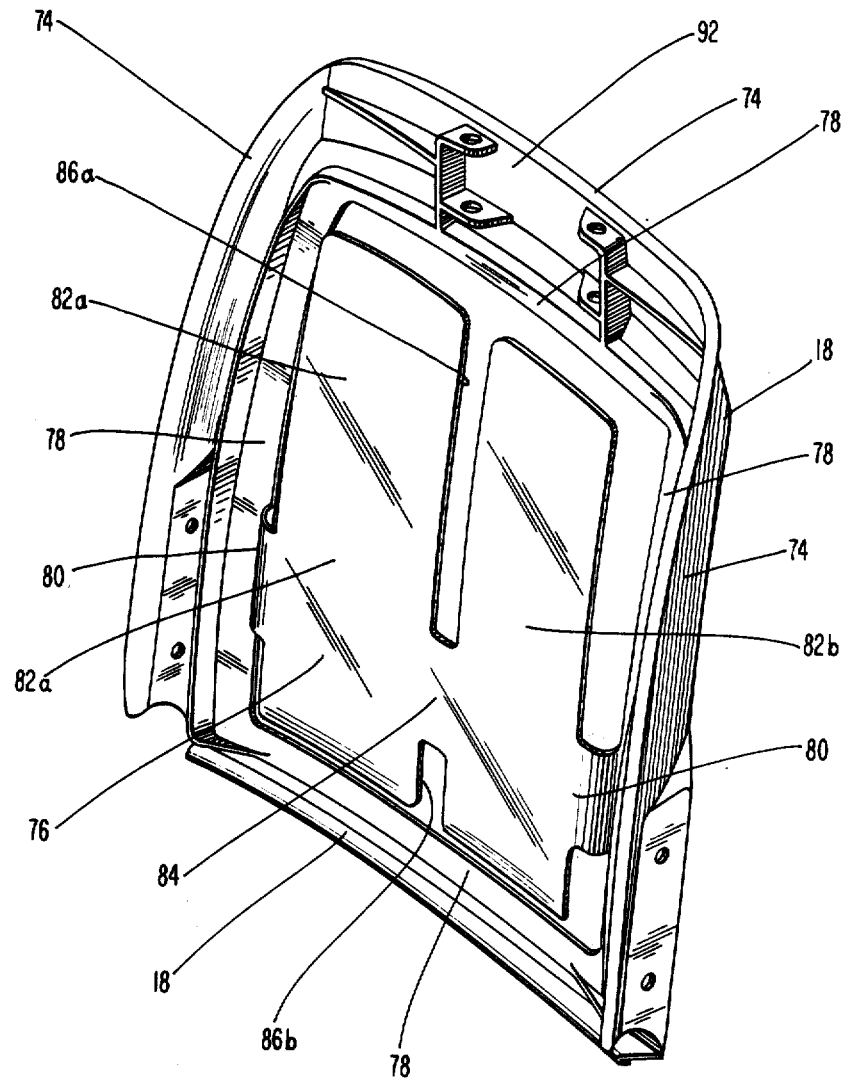

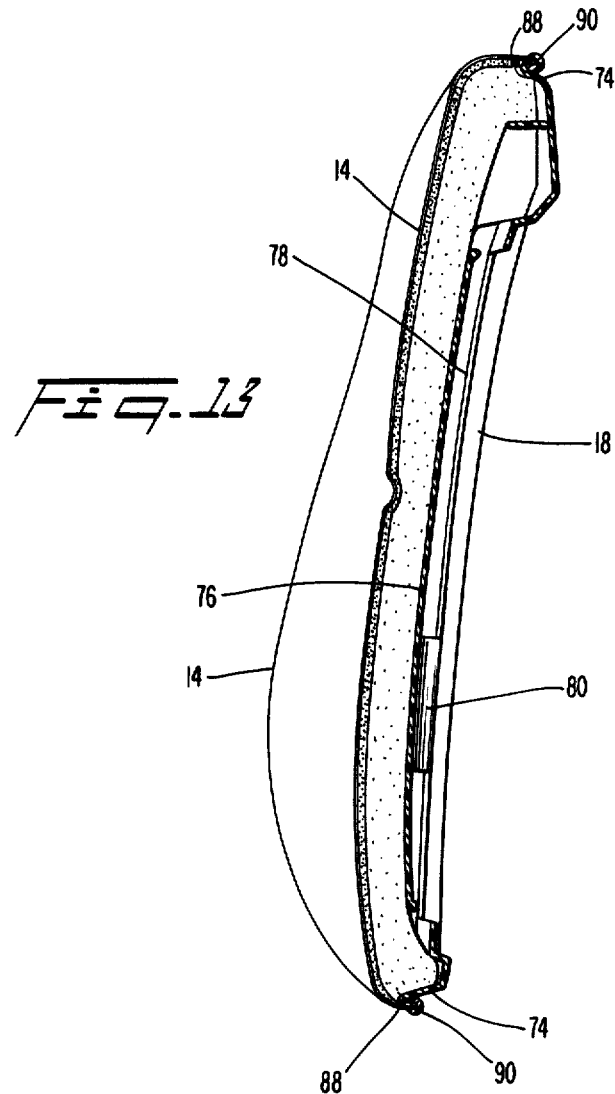
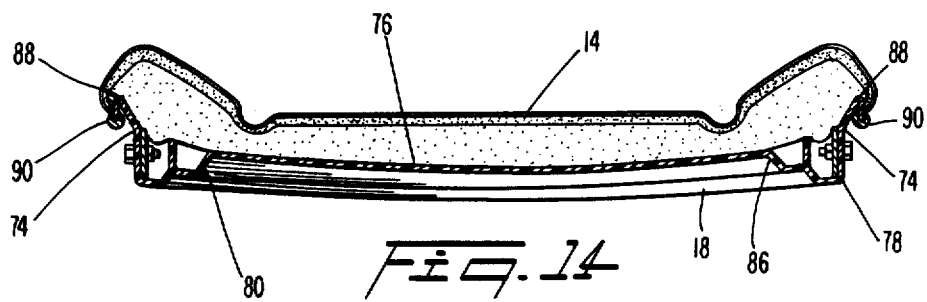

SEAT FOR VEHICLES

BACKGROUND OF THE INVENTION

1. Field of the Invention

The present invention relates to a seat frame, and more particularly to a lightweight seat frame construction for vehicles which facilitates operation of the foot pedals.

2. Description of the Prior Art

In a conventional seat, generally a seat cushion mounted on a seat frame is provided for flexibly supporting a passenger. Further, a support structure is located on a vehicle floor and attached to a base portion of the seat frame. In recent years, seat frames commonly are made of plastic to provide a lightweight structure. For example, in U.S. Pat. No. 4,065,182 to Braniff et al. the seat cushion is directly mounted on a plastic seat frame and the rear surface of a backrest cushion is directly supported by a backrest frame made of plastic. In Japanese patent publication No. 55-118715 (1980), a spring mechanism is provided on a plastic seat frame and the lower surface of a seat cushion is supported by the spring mechanism, while or the rear surface of a backrest cushion is supported by another spring mechanism.

Generally, a vehicle seat provides a varying degree of retraction as measured from forward to rearward along the surface of the seat in response to the weight of the seated passenger. This characteristic, which is defined as the spring constant, is shown in FIG. 2. The maximum spring constant, depicted as point "A", is located forward of the point "HP", which supports the buttocks of the seated passenger. The spring constant is gradually decreased forward of point A and is minimum at the front end of the seat. The spring constant is also slightly decreased immediately rearward from point A, before remaining constant. Accordingly, the forward slip of the buttocks of the passenger along the upper surface of the seat is blocked at the point A, while actuation of the foot pedals is somewhat smoothed by decreasing the supporting force of the lap at the front end of the seat.

Nevertheless, the spring characteristics of the seat is defined by the hardness and the thickness of the seat cushion. As such, the seat cushion must be thickened in order to become comfortable and able to absorb the vibration of the seat from the road surface, particularly when the seat on which the seat cushion is directly mounted on the seat frame made of plastic. The seat having the foregoing construction is uneconomical and also prevents smooth actuation of the foot pedals. The latter results because the passenger tends to sink within the thickened elastic seat cushion increasing the tension on the edges of the seat. Thus, smooth actuation of the foot pedals is limited by the thickened portion at the front edge of the seat cushion.

SUMMARY OF THE INVENTION

Accordingly, it is an objective of the invention to provide a comfortable, lightweight seat for vehicles.

It is also an objective of the present invention to provide a seat for vehicles which does not unduly restrict smooth operation of the foot pedals.

It is another objective of the present invention to provide a seat for vehicles which is economical and easy to construct.

Additional objectives and advantages of the present invention will be set forth in part in the description that follows and in part will be obvious from the description or may be learned by practice of the invention. The objectives and advantages of the invention may be realized by the apparatus as particularly pointed out in the appended claims.

To achieve the foregoing objectives and in accordance with the purpose of the invention, as embodied and broadly described herein, a seat mounted on a vehicle floor of the present invention comprises a seat frame having a plastic base member and an open section formed within a base member. The base member is circumscribed by a rim extending upward along a substantial portion of the base member and a support surface extending outward from the base member substantially perpendicular to the rim. The base member includes a plate section integrally connected to the base member and extending within the open section. Means are provided for firmly supporting the plate section in response to downward pressure. Means are also provided for adjustably supporting the seat frame along the floor of the vehicle. A pair of support rods are connected to the adjustable support means, and the seat frame is attached to the support rods. A seat cushion is attached to the seat frame for supporting the seated passenger.

The present invention further includes a backrest connected to the seat frame and including a backrest frame having sidewalls extending outward from the backrest frame. A backplate is mounted within the sidewalls of the backrest frame and means are provided for connecting the backrest plate to the backrest frame. A backrest cushion is attached to the backrest frame for flexibly supporting the back of the seated passenger.

The seat of the present invention may include means for firmly supporting the plate section comprising at least one spring extending across at least a portion of the open section. Means are provided for attaching the at least one spring to the seat frame. Means are also provided on the base of the plate section for holding the at least one spring in engagement with the plate section.

The seat of the present invention may include means for firmly supporting the plate section comprising a first groove extending along the plate section and continuing along at least a portion of the base member. A predetermined one of the support rods is positioned within the first groove. A first elastic member envelops at least a portion of the predetermined one of the support rods to provide flexible support for the plate section. Further, a second groove extends along the base member spaced apart from the first groove. The remaining support rod is positioned within the second groove. A second elastic member envelops at least a portion of the remaining support rod to provide additional flexible support for the seat frame.

The seat of the present invention may also include at least one cut-out section within the support surface. Each cut-out section has a substantially U-shaped configuration to provide flexible support for the buttocks of the seated passenger. The seat cushion of the present invention is attached to the seat frame by flange means extending along a peripheral edge of the seat frame for engaging a peripheral edge of the seat cushion. Means are provided for clamping the peripheral edge of the seat cushion to the flange means to hold the cushion to the seat.

The backplate of the present invention may include a pair of substantially rectangular planar surfaces spaced apart and independently movable. A lumbar support connects the pair of planar surfaces. The backplate also includes a curved end section extending along the peripheral edge of the backrest frame for engaging a peripheral edge of the backrest cushion. Means are provided for securing the backrest cushion to the curved end section of the backplate.

The accompanying drawings, which are incorporated in and constitute part of the specification, illustrate preferred embodiments of the invention and, together with a description, serve to explain the principles of the invention.

BRIEF DESCRIPTION OF THE DRAWINGS

FIG. 3 is a comparative pressure graph which shows pressure distribution characteristics for a vehicle backrest in accordance with the invention (left) and in accordance with a typical, conventional vehicle backrest (right);

FIG. 4 is a perspective view of one embodiment of a seat frame in accordance with the invention;

FIG. 5 is a sectional view taken along line V—V in FIG. 1;

FIG. 7 is a sectional view taken along line VII—VII in FIG. 6 with a seat cushion shown mounted thereto;

FIG. 9 is a perspective view of a seat frame according to another embodiment of the present invention;

FIG. 10 is sectional view showing the seat frame viewed along line x—x in FIG. 9 with a seat cushion shown mounted thereto;

FIG. 11 is a perspective view of a seat frame according to another embodiment of the present invention;

FIG. 12 is a perspective view of backrest frame according to the present invention;

FIG. 13 is a sectional view of the backrest taken along line XIII—XIII of FIG. 1;

FIG. 14 is a sectional view of the backrest taken along line XIV—XIV of FIG. 1.

DETAILED DESCRIPTION OF THE PREFERRED EMBODIMENT

Reference will now be made to a presently preferred embodiment of the present invention, examples of which are illustrated in the accompanying drawings.

Figure 1:
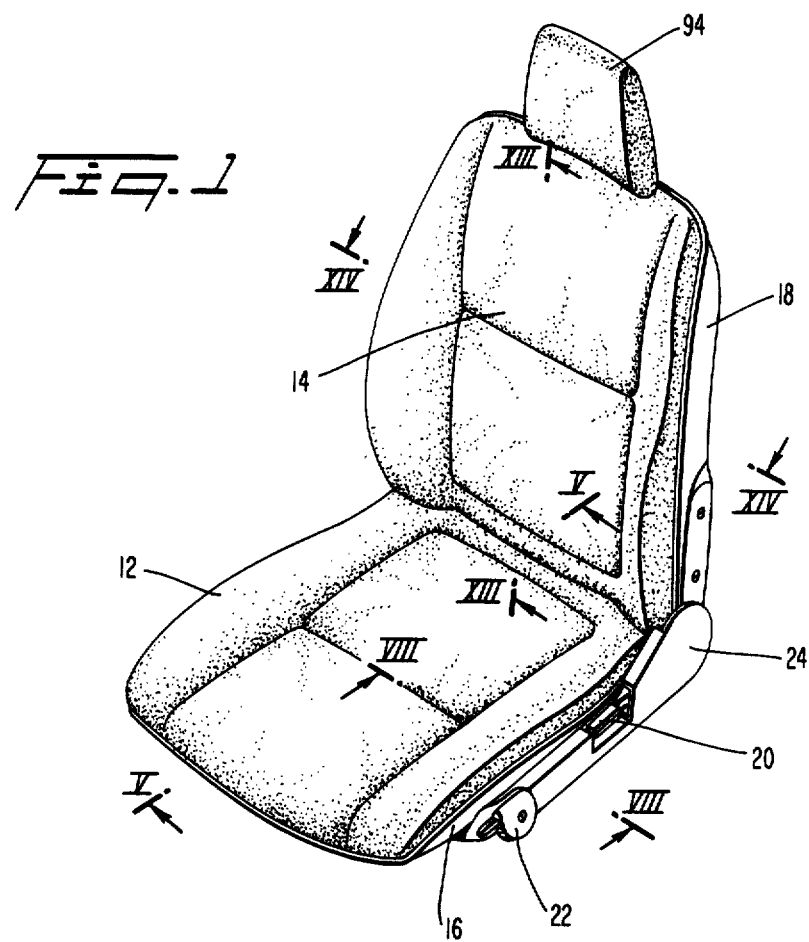
FIG. 1 is a perspective view showing a seat assembly in accordance with the invention having a cushioned seat frame and a cushioned backrest frame according to the present invention.
Figure 2:
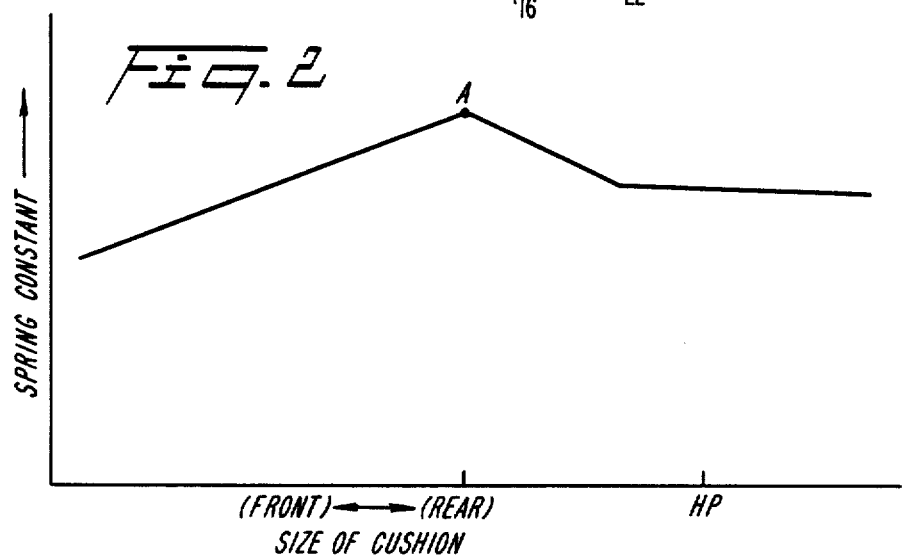
FIG. 2 is a graph depicting the spring characteristics typically required for vehicle seats.

Referring now to FIG. 1, reference numeral 10 denotes a seat for vehicles having a seat cushion 12 and a backrest cushion 14. Seat cushion 12 is supported on a seat cushion frame 16, while the backrest cushion 14 is supported by a backrest frame 18 extending upward from the rear of the seat 10. Conventional seat adjusting means for the seat cushion frame 16 is positioned beneath the seat cushion frame 16 and includes a handle 20 and a knob 22. A cover plate 24 is mounted on the seat adjusting means leaving handle 20 and knob 22 accessible to the seated passenger.

The seat cushion frame 16 and the backrest frame 18 are formed from molded plastic and have a substantially rectangular configuration, as viewed in FIGS. 4 and 12, respectively. As shown in FIG. 4, sidewalls 26a,b and rear wall 27 extend upward along the sides and the rear of a base member 19 of the seat cushion frame 16, while support surface 28 extends along the front portion of the seat cushion frame 16. As shown in FIG. 1, a seat cushion 12 is positioned on the seat cushion frame 16. The seat cushion 12 is partially supported on the support surface 28 and is positioned between the sidewalls 26, as viewed together in FIGS. 1 and 4. The seat cushion frame 16 also includes a curved flange portion 30, as shown in FIG. 5, which extends along the peripheral edge of the seat cushion frame 16. A peripheral edge of the seat cushion 12 is clamped to the flange portion 30 by a clip 32, as shown in FIG. 5.

Figure 8:
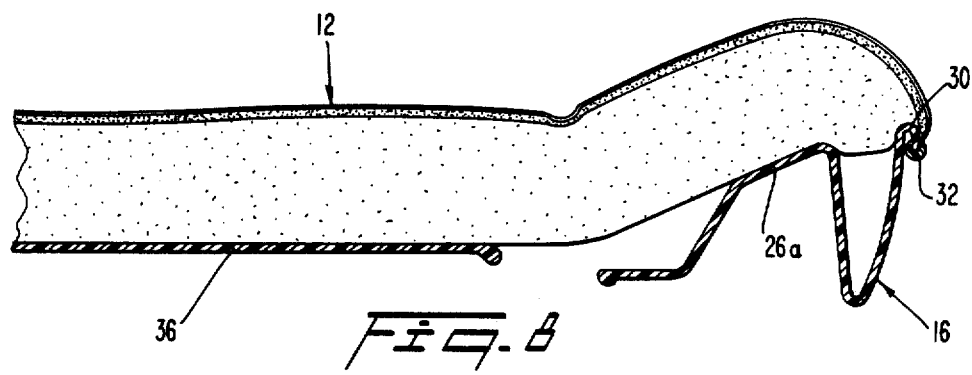
FIG. 8 is a sectional view taken along line VIII—VIII in FIG. 1.

The rearward ledge 34, as best shown in FIG. 4, of the support surface 28 extends between the sides of the seat cushion frame 16, at a position that is slightly forward of the center of the seat cushion 12, as measured from the front to the rear of the seat cushion frame 16. A plate member 36 extends from the rearward edge 34 of the support surface 28 toward the rear of the seat cushion frame 16, as viewed in FIGS. 4 and 8. Plate member 36 supports a portion of the seat cushion 12 on which the buttocks of the seated passenger is positioned. Plate 36 is formed of plastic material and has a substantially planar shape. The plate member 36, which is integrally molded to the support surface 28, may be pivoted upward and downward about the rearward edge 34 of the support surface 28.

As shown in FIG. 4, a continuous U-shaped torsion spring 38 is connected to the seat cushion frame 16 along a ridge member 40 proximate the rear sidewall 27. The ridge member 40 includes hooks 42 and grooves 44 for receiving torsion spring 38. The rearward surface of the plate member 36 includes a pair of recesses 46a,b. The torsion spring 38 extends within the recesses and around the side of the plate member. As shown in FIG. 4, a portion of the torsion spring is retained within hooks 42 and grooves 44. The ends (not shown) of the torsion spring 38 are fixedly connected to both sides of the seat cushion frame 16. Accordingly, torsion spring 38 provides flexible support for the rear of the plate member 36. As viewed in FIG. 5, projections 48a,b are formed between recesses 46a,b and each side of plate member 36 to engage and to regulate the forward movement of the plate member 36.

Forward groove 50 extends along the base of the support surface 28 between the sides of the seat cushion frame 16. A rear groove 52 extends between the sides of the seat cushion frame substantially beneath the ridge member 40. Connecting rods 54, 56 are fixedly connected within the forward and rearward grooves 50, 52 respectively, for supporting the seat cushion frame 16. The connecting rods 54, 56 support the seat cushion frame 16 about the floor of the vehicle through the seat adjusting means.

Figure 6:
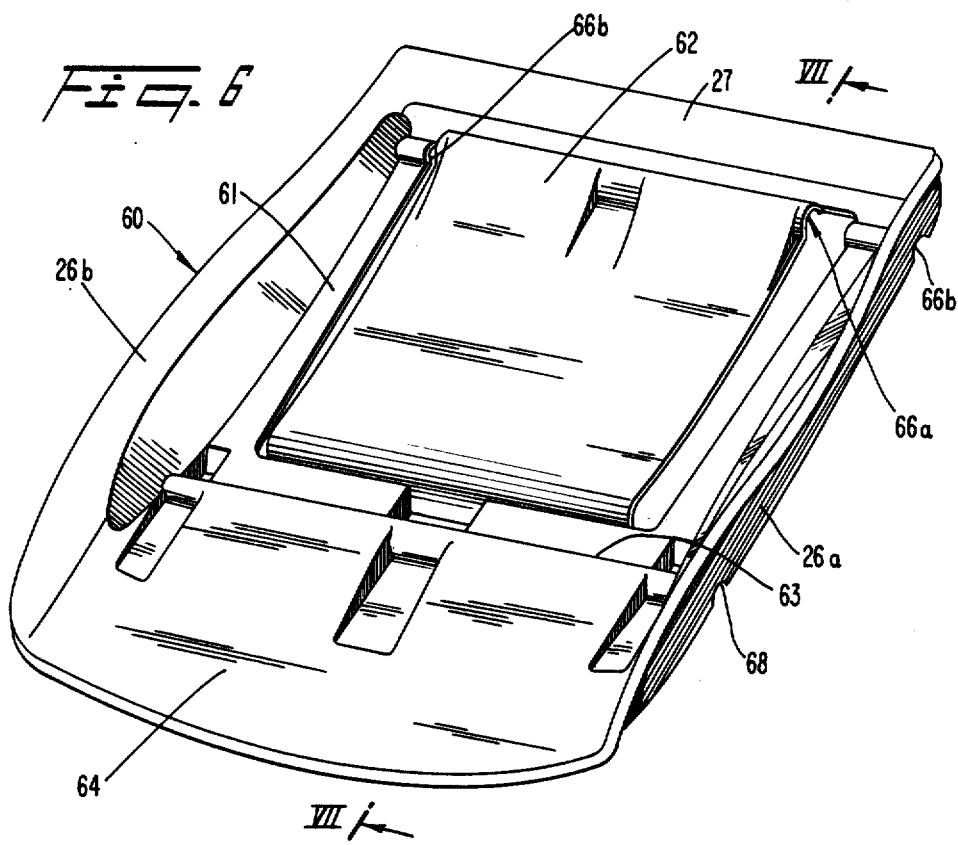
FIG. 6 is a perspective view of a seat frame according to another embodiment of the present invention.

According to another embodiment of the present invention, shown in FIGS. 6 and 7, seat cushion frame 60 includes a base member 61 having a seat plate 62 attached to a support frame 64 along a ledge 63 extending between the sides of the seat frame 60 at the front of the seat cushion frame. The seat frame 60 and the seat plate 62 have rear groove sections 66a,b, respectively, which are fixedly positioned on connecting rod 56. A forward groove section 68 extends on the lower surface of seat plate 62 for fixedly attaching the seat frame 60 to connecting rod 54. According to this embodiment, elastic members 69a,b are attached to both connecting rods 56, 54, respectively, enabling flexible support for the seat cushion frame 16 within the forward groove section 68 and the rearward groove sections 66a,b.

According to another embodiment of the present invention, as shown in FIGS. 9 and 10, the support surface 28 of the seat cushion frame 16 defines a substantially planar surface includes a pair of cut-out sections 70a,b formed within support surface 28. The cut-out sections 70a,b are substantially U-shaped planar sections integrally connected to the support surface 28 and extend upward at an angle away from the planar surface, as viewed together in FIGS. 9 and 10. Each cut-out section 70a,b is constructed so as to be positioned to provide flexible support for the knee of the seated passenger through the seat cushion 12. Since the cut-out sections 70a,b are plastic and have a substantially flat plate shape, they are upwardly and downwardly movable along the front of the support surface 28. As shown in FIG. 9, the rear end of the support surface 28 is positioned slightly forward of the center of the seat cushion frame 16. Accordingly, the plate member 36 is located to support the buttocks of the seated passenger through the seat cushion 12. The plastic plate member 36 is movable upwardly and downwardly about the rearward edge 34, as best shown in FIGS. 9 and 11, of the support surface 28. In the embodiment depicted in FIG. 11, a single cut-out section 78 is formed within the support surface 28 to accommodate one knee of the passenger, as in an automatic transmission vehicle, which has a single foot pedal. In such cases, a remaining support surface 28 provides stable support for the other knee of the seated passenger.

According to the above-described embodiments, the seat cusion 12 formed on plastic plate member 36 may be thickened, if such is necessary to modify the firmness of the support provided by the seat 10. Spring means may also be provided on the seat adjusting means, so that the load acting on the spring means is transmitted to the seat adjusting means without acting on the seat cushion frame 13.

FIG. 12 depicts backrest frame 18 of the present invention. Backrest sidewalls 74 extend forward, toward the seated passenger, and along the periphery of the backrest frame 18. The backrest frame 18 includes a backplate 76 and an inner extension 78 which is integrally formed between the backrest sidewalls 74. The backrest cushion 14 is mounted on the backplate 76. The backplate 76 is connected to the inner extension 78 through narrowed first connecting portions 80 and, therefore, provides flexible support for the passengers's back. Backplate 76 comprises two substantially rectangular planar surfaces 82a,b positioned alongside one another. First connecting portions 80 extend from opposite sides of the inner extension 78. A substantially narrow second connecting portion 84 connects both planar surfaces. The first and second connecting portions divide the backplate 76 into upper and lower support surfaces. The planar surfaces 82a,b are movable essentially forward and rearward, in response to urging by the seated passenger. Accordingly, each planar surface is movable in forward and rearward direction of the seat around the first and second connection portions 80, 84. Slits 86a,b are formed between the edges of the planar surface 82a,b, which are not attached by the second connecting portion 84. Thus, each planar surface 82a,b is independently movable.

The first connecting portions 80 have an arcuate shape projecting foward of the inner extension 78. The first connecting portions 80 have sufficient stiffness to support the weight of the passenger acting on the backrest frame 18. As shown in FIG. 13, the backrest cushion 14 is secured to the backrest frame 18 by clamping a peripheral edge of the backrest cushion 14 to flange 88, which extends along the peripheral edge of the backrest frame 18. As shown in FIGS. 13 and 14, the clamping of the backrest cushion 14 to the flange 88 is provided by a clip 90.

As viewed in FIGS. 13 and 14, the peripheral surface of the backrest cushion 14 is rigidly supported by the inner extension 78 of the backrest frame 18. The planar surfaces 82a,b of the backplate support the central portion of the backrest cushion 14. Since the first connecting portions 80 support the planar surfaces 82a,b, the backrest cushion provides flexible support for the back of the seated passenger. The first and second connecting portions 80, 84 are located slightly lower than the central part of the backrest frame 18 and corresponds to the lumbar portion of the seated passenger. Thus, planar surface 82a,b are flexible about the first and second connecting portions 80,84. Accordingly, the rectangular planar surfaces 82a,b provide the firmness support at the lumbar portion of the seated passenger, while being increasingly flexible above and below this portion of the backrest. Thus, the backrest cushion 14 of the present invention is able to provide a more even pressure distribution along its surface, as shown in the graph on the lefthand side of FIG. 3, in which point A is depicted as the maximum spring constant for the backrest. Further, since planar surfaces 82a,b are separated in large measure by slits 86a,b, the planar surfaces 82a,b are independently movable. As a result, the backrest of the present invention provides firm but flexible support to the seat of the passenger.

Figure 15:
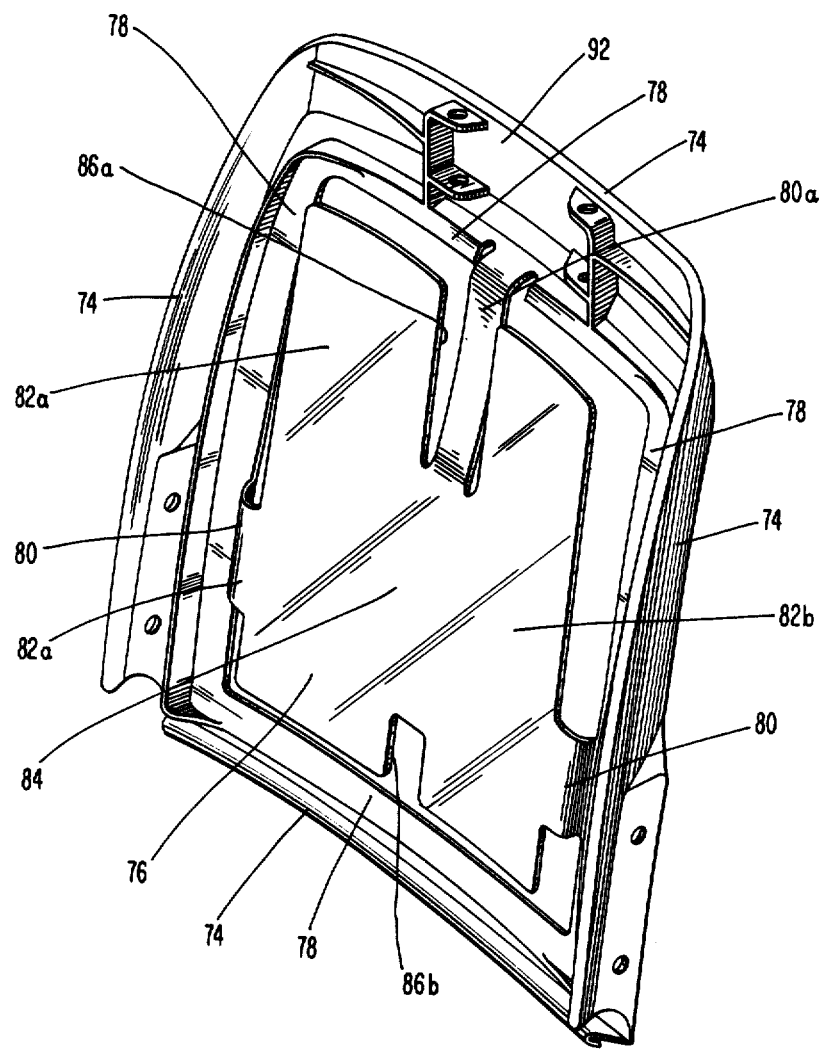
FIG. 15 is a perspective view of a backrest according to another embodiment of the present invention.

According to another emobodiment of the present invention, as shown in FIG. 15, the backplate 76 is configured to provide firmer support for the seat of the passenger. In this embodiment, the second connecting portion 84 is extended, thereby decreasing the size of the slits 86a,b. In addition, the first connecting portions 80 include a separate extension 80a that is connected between the upper portion of inner extension 78 and the second connecting portion 84. Thus, the overall stiffness of the backrest cushion 14 of the present invention is increased by providing three separate first connecting portions 80.

According to the above-mentioned embodiments, the backplate 76 includes planar surfaces 82a,b to provide flexible, comfortable support to the seated passenger. Further, since the planar surfaces 82a,b are integrally formed with the backrest frame 18 through plastic molding, the manufacture of the seat having this configuration is simplified and economical. The backrest may also include a headrest mount 92, as shown in FIGS. 12 and 15, into which a conventional headrest 94 is mounted, as shown in FIG. 1.

It will be apparent to those skilled in the art that modifications and variations can be made to the seat of the present invention. The invention in its broader aspects is, therefore, not limited to the specific details, representative apparatus, and illustrative examples shown and described. Thus, it is intended that all matter contained in the foregoing description or shown in the accompanying drawings shall be interpreted as illustrative and not in the limiting sense.

What is claimed is:

1. A seat for mounting on a vehicle floor comprising:
   a molded plastic seat frame having a substantially rectangular base member and including sidewalls and a rear wall extending upward from said base member for retaining a seat cushion therebetween, said seat frame having a ledge extending along said base member between said sidewalls and dividing a front portion of said frame from a rear portion, said base member having a support surface extending forward of said ledge for supporting a forward portion of said seat cushion, said support surface defining a planar surface and including at least one cut-out section having a substantially U-shaped configuration extending upward at an angle away from said planar surface for providing flexible support for said seat cushion, said base member also having an open section and a plate member extending rearward from said ledge within said open section, said plate member being pivotally positioned about said ledge and supporting a rearward portion of said seat cushion independent of said forward portion of said seat cushion, said rear portion having a ridge member between said sidewalls along said rear wall;
   spring means connected to said ridge member and extending within said open section for flexibly supporting a rearward portion of said seat cushion positioned on said plate member, said plate member including means for holding said spring means in engagement with said plate member;
   front and rear connecting rods for firmly supporting said seat frame, said front connecting rod being aligned substantially adjacent said ledge and said rear connecting rod extending substantially adjacent said ridge member; and
   a backrest connected to said seat frame and supporting a backrest cushion.

2. The seat as defined in claim 1, wherein said seat frame includes:
   a flange portion at a peripheral edge of said seat frame; and
   means for clamping said peripheral edge of said seat cushion to said flange portion.

3. A seat for mounting on a vehicle floor comprising:
   a molded plastic seat frame having a substantially rectangular base member and including side walls and a rear wall extending upward from said base member for retaining a seat cushion therebetween, said seat frame having a ledge extending along said base member between said sidewalls and dividing a front portion of said seat frame from a rear portion, said base member having a first groove aligned substantially adjacent said ledge and a support surface extending forward of said first groove for supporting a forward portion of said seat cushion, said base member also having an open section and a plate member extending rearward from said ledge within said open section, said base member supporting a rearward portion of said seat cushion independent of said forward portion of said seat cushion, said plate member having a second groove extending substantially parallel to said first groove along a rearwardmost portion of said plate member;
   front and rear connecting rods for supporting said seat frame, said front rod being aligned with said first groove and said second rod being aligned with said second groove;
   first elastic means attached to said front connecting rod and engaged to said base member along said first groove for flexibly supporting said forward portion of said seat cushion;
   second elastic means attached to said rear connecting rod and engaged to said plate member along said second groove for flexibly supporting a rearward portion of said seat cushion along said plate member; and
   a backrest connected to said seat frame and supporting a backrest cushion.

4. The seat as defined in claim 3, wherein said support surface defines a planar surface and includes at least one cut-out section having a substantially U-shaped configuration extending upward at an angle away from said planar surface for providing additional flexible support for said forward portion of said seat cushion.

5. The seat as defined in claim 3, wherein said support surface includes:
   a flange portion at a peripheral edge of said seat frame; and
   means for clamping said peripheral edge of said seat cushion to said flange portion.

6. A seat for mounting on a vehicle floor comprising:
   a molded plastic seat frame for flexibly supporting a rearward portion of a seat cushion independent of a forward portion of said seat cushion, said seat frame having a substantially rectangular base member, and also having sidewalls and a rear wall extending upward from said base member for retaining said seat cushion therebetween, said seat frame having a ledge extending along said base member between said sidewalls and dividing a front portion of said seat frame from a rear portion, said base member having a support surface extending forward of said ledge for supporting said forward portion of the seat cushion, said support surface defining a planar surface and including at least one cut-out section having a substantially U-shaped configuration extending upward at an angle away from said planar surface for providing flexible support for said forward portion of said seat cushion, said base member also having a first open section and a plate member extending rearward from said ledge within said first open section, said plate member being pivotally positioned about said ledge, said rear portion having a ridge member between said sidewalls along said rear wall;
   a backrest frame pivotally connected to said seat frame and adapted to be secured in an operative position to said seat frame, said backrest frame having sidewalls extending from a periphery of said backrest frame, said backrest frame defining a second open section; and
   a backplate flexibly mounted within said second open section, said backplate having a pair of substantially rectangular planar surfaces spaced apart and independently movable, said backplate also including lumbar extensions connecting said pair of substantially rectangular planar surfaces and said backrest frame, said lumbar extensions being integrally formed with said backplate.

7. The seat as defined in claim 6, wherein said seat frame includes:

a flange portion at a peripheral edge of said seat frame; and means for clamping said peripheral edge of said seat cushion to said flange portion.

8. A seat for mounting on a vehicle floor comprising:

a molded plastic seat frame for flexibly supporting a rearward portion of a seat cushion independent of a forward portion of said seat cushion, said seat frame having a substantially rectangular base member, said seat frame also having side walls and a rear wall extending upward from said base member for retaining said seat cushion therebetween, said seat frame having a ledge extending along said base member between said sidewalls and dividing a front portion of said seat frame from a rear portion, said base member having a first groove aligned substantially adjacent said ledge and a support surface extending forward of said first groove for supporting said forward portion of said seat cushion, said base member also having a first open section and a plate member extending rearward from said ledge within said first open section, said plate member having a second groove extending substantially parallel to said first groove along a rearwardmost portion of said plate section;

front and rear connectng rods for supporting said seat frame, said front rod being aligned with said first groove and said second rod being aligned with said second groove;

first elastic means attached to said front connecting rod and engaged to said base member along said first groove for flexibly supporting said forward portion of said seat cushion;

second elastic means attached to said rear connecting rod and engaged to said plate member along said second groove for flexibly supporting said rearward portion of said seat cushion along said plate member;

a backrest frame pivotally connected to said seat frame and adapted to be secured in an operative position to said seat frame, said backrest frame having sidewalls extending from a periphery of said backrest frame for retaining a backrest cushion, said backrest frame defining a second open section; and a backplate flexibly mounted within said second open section, said backplate having a pair of substantially rectangular planar surfaces spaced apart and independently movable, said backplate also including lumbar extensions connecting said pair of substantially rectangular planar surfaces and said backrest frame, said lumbar extensions being integrally formed with said backplate.

9. The seat as defined in claim 8, wherein said support surface defines a planar surface and includes at least one cut-out section having a substantially U-shaped configuration extending upward at an angle away from said planar surface.

10. The seat as defined in claim 8, wherein said support surface includes:

a flange portion at a peripheral edge of said seat frame; and means for clamping said peripheral edge of said seat cushion to said flange portion.

* * * * *

UNITED STATES PATENT AND TRADEMARK OFFICE
CERTIFICATE OF CORRECTION

PATENT NO. : 4,711,497

DATED : December 8, 1987

INVENTOR(S) : Kenichi Kazaoka et al.

It is certified that error appears in the above-identified patent and that said Letters Patent is hereby corrected as shown below:

FIGURE 1 should appear as shown below:

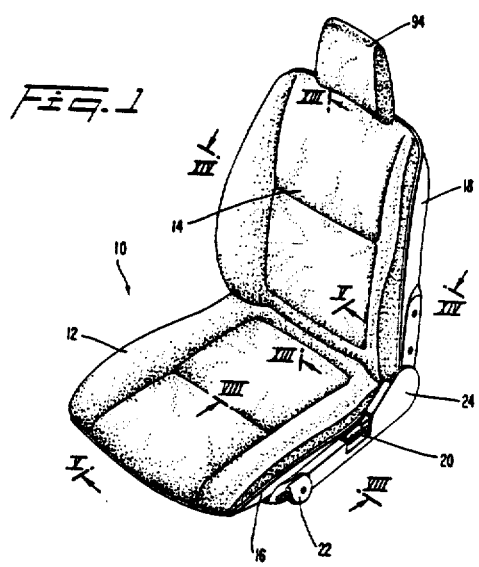

Signed and Sealed this

Fifth Day of July, 1988

Attest:

DONALD J. QUIGG

Attesting Officer      Commissioner of Patents and Trademarks